United States Patent
Beardsley et al.

[15] 3,680,580
[45] Aug. 1, 1972

[54] BUMPLESS-TRANSFER CONTROL SYSTEM

[72] Inventors: Earl A. Beardsley; Hoel L. Bowditch; Robert C. Prescott, all of Foxboro, Mass.

[73] Assignees: The Foxboro Company, Foxboro, Mass.

[22] Filed: Sept. 1, 1970

[21] Appl. No.: 68,750

Related U.S. Application Data

[63] Continuation of Ser. No. 772,593, Nov. 1, 1968, abandoned.

[52] U.S. Cl. ............................................. 137/86
[51] Int. Cl. ......................... F15b 5/00, G05d 16/00
[58] Field of Search ............. 137/86, 82, 85, 86 MA

[56] References Cited

UNITED STATES PATENTS 2,747,595   5/1956   Dickey ............................. 137/82

*Primary Examiner*—Alan Cohan
*Attorney*—Bryan, Parmelee, Johnson & Bollinger

[57] ABSTRACT

A pneumatic controller has means for effecting bumpless-transfer between an automatic control mode of operation and a manual control mode; in the automatic mode, a pneumatic controller operates the process in a conventional manner, with the output signal to the process also being supplied to a follower device at an auto-manual station, positioning a mechanism continuously in accordance with the output signal to the process; upon transfer to the manual mode, the follower mechanism is placed into actuation by a manual set point, with the output signal to the process thereupon being provided from the manual-auto station; in addition, the output to the process is applied as a set point signal to a secondary pneumatic controller which is connected in a configuration with the primary pneumatic process controller such as will maintain the output bellows of the primary controller at the same pressure as the output signal to the process; to do this, the reset bellows of the primary process controller is supplied with a signal which will balance large deviations between measurement and set point supplied to the primary process controller; upon transfer from manual to automatic, the output of the primary process controller, being the appropriate pressure, is connected to provide the output signal to the process, and the secondary controller disconnected; deviation in output to the process from that demanded by the differential between measurement and set point is integrated in the normal pneumatic controller manner, according to the reset setting.

15 Claims, 3 Drawing Figures

BUMPLESS-TRANSFER CONTROL SYSTEM

This application is a continuation of Ser. No. 772,593, filed Nov. 1, 1968, now abandoned.

This invention relates to controllers having an automatic bumpless transfer mechanism, and more specifically to a pneumatic controller system employing a secondary controller for maintaining the output of a primary controller at the output pressure to the process during manual operation, and employing a device for continuously following output pressure to the process from the primary controller during automatic control conditions.

The invention herein will be understood from the disclosure herewith in conjunction with the Figures in which.

Figure 1:
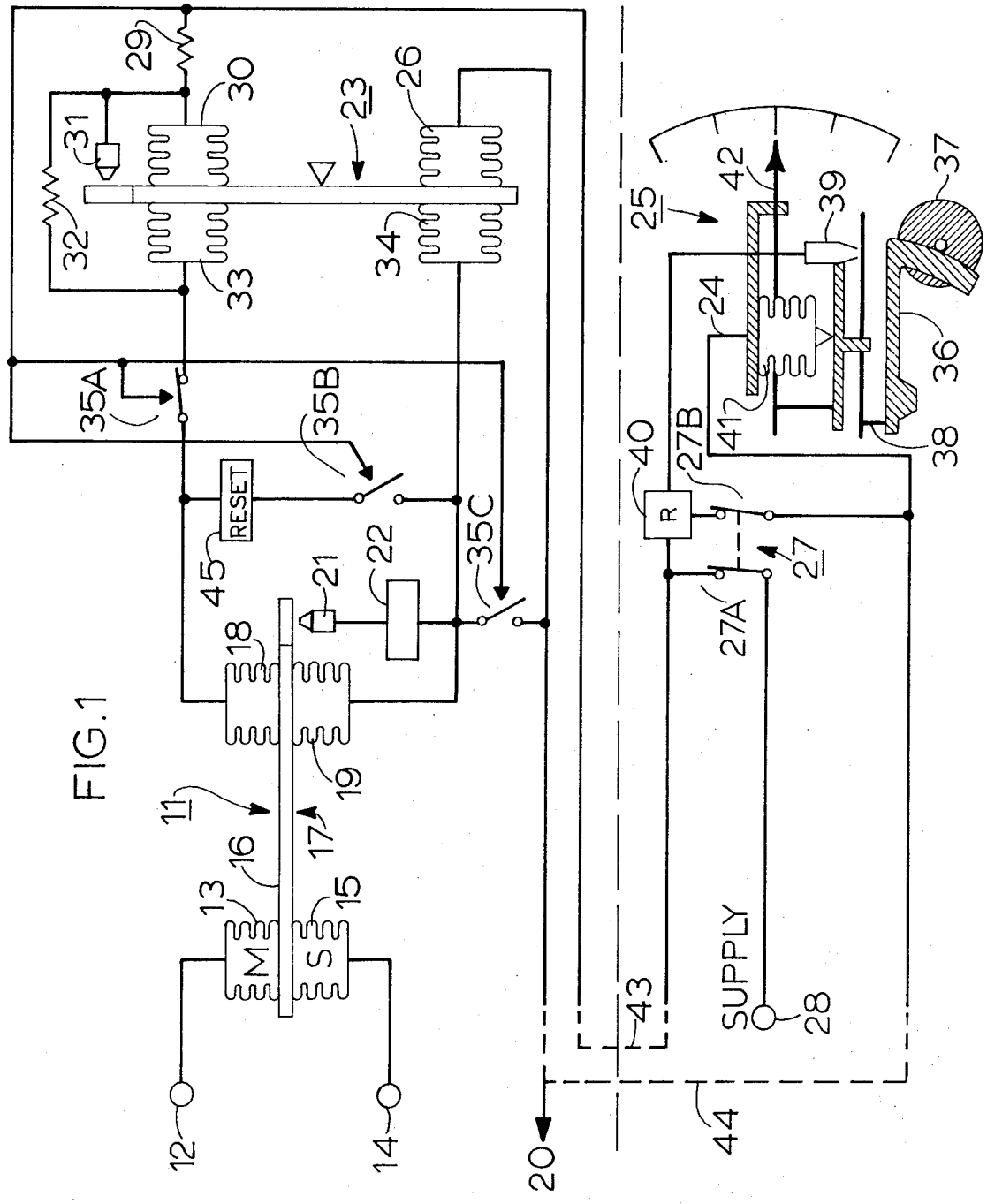
FIG. 1 is a schematic type of diagram of a pneumatic bumpless transfer system employing a primary process controller, a secondary controller, and a manual-automatic station.

Referring to FIG. 1, a primary process controller 11 has a measurement signal 12 supplied to measurement bellows 13 and a set point pressure 14 supplied to set point bellows 15 therewith. Measurement bellows 13 and set point bellows 15 are opposing bellows on a force bar 16 pivoted at point 17, with another set of bellows 18 and 19 being opposed on the other side of pivot 17. Bellows 18 performs the integrating function during normal process control and bellows 19 is the output bellows, being connected through switching section 35C to supply a signal 20 to the process during automatic operation. The switching configuration shown in FIG. 1 represents the manual mode of operation. A nozzle 21 and a relay 22 are operated in conjunction with force bar 16 and the output bellows 19 in the automatic mode to produce a pressure in bellows 19 such as will balance the various components of controller 11.

In the manual mode of operation, as is represented by the switching in FIG. 1, a secondary controller 23 is interconnected with the output signal 24 of follower 25 and bellows 18 and 19 of controller 11. Output signal 24, which is supplied to process output 20 in the manual mode, is also supplied to bellows 26 of controller 23 as a set point type of signal. Controller 23 is activated in the manual mode by an enabling switching signal from automatic-manual switch 27, wherein a supply source 28 is connected through section 27A and restrictor 29 to bellows 30 of controller 23. Bellows 30 in conjunction with nozzle 31 performs a proportioning function and the pressure from bellows 30 is transferred through restrictor 32 to bellows 33, performing an integrating function. Bellows 34 of controller 23, opposing set point bellows 26, performs the measurement function, with the pressure from bellows 19 of primary controller 11 being connected directly into measurement bellows 34 of secondary controller 23. The function of controller 23 during the manual mode is to maintain the pressure in bellows 18 at such a value as will produce a resultant pressure in bellows 19 of controller 11 and thus the pressure in bellows 34 of controller 23 at the set point pressure in bellows 26. That is, the manual process pressure from manual station 25 is made to appear in the output bellows 19 of controller 11 during manual operation by means of controller 23. This is effected by a switched connection 35A which in manual connects the pressure in bellows 33 of secondary controller 23 ro reset bellows 18 of primary controller 11. During the manual operation the reset capacity 45 is disconnected from relay 22 by switching section 35B, while the output from bellows 19 is disconnected from process output 20 by switching section 35C. Switching is enabled through section 27A of manual-automatic switch which sends a pressure in the manual condition to sections 35A, B, and C such as connects 35A and disconnects 35B and C.

The manual station 25 contains a mechanism more fully described in copending U.S. Pat. application No. 772,597. Briefly, during manual operation a mechanism 36 is positioned by manual set point knob 37 operating through a linkage 38 to control a nozzle 39 connected to a relay 40 which through switching section 27B supplies a rebalancing pressure to bellows 41, as well as a pressure directly to process output 20. The bellows 41 pressure, and thus the process output pressure 20 is indicated by pointer 42.

In the automatic mode of operation sections 27A and 27B of transfer switch 27 are opened thus interrupting the relay 40 output, and de-activating secondary controller 23, and placing switch sections 35A, 35B and 35C in their automatic positions; section 35A is disconnected and sectors 35B and 35C are connected. At this time, during the automatic phase, the process output 20 is derived from bellows 19 of primary controller 11 through connected switch section 35C; the signal supplied to process output 20 is connected into bellows 41, which mechanically positions sector gear 36 through linkage 38 to a position appropriate to the process output pressure. Also, during the automatic mode, manual knob 37 is detached from the sector gear 36, so that bellows 41 is free to operate to position sector gear 36 in relation to the output pressure at 20.

Bumpless transfer from manual to automatic occurs inasmuch as the connection of bellows 19 to control the process through switch section 35C finds the pressure in bellows 19 the same as the signal already furnished to output 20 from the manual station 25. Interconnections 43 and 44 connect the switching signal and the output 20 signal respectively between the auto-manual components 25 and 27 and the primary and secondary controllers 11 and 23. The configurations thereby provided allows the removal of the component group comprising follower 25, relay 40 and switch 27 as a sub-unit from the system, without influencing the automatic operation of the remainder of the system. This is because the switching signal supplied through line 43 is passive or atmospheric in the automatic mode, and because line 44 incorporates sufficient restriction so that during removal of station 25 bellows 19 of controller 11 in conjunction with relay 22 may supply a sufficient flow of output 20 signal.

Figure 2:
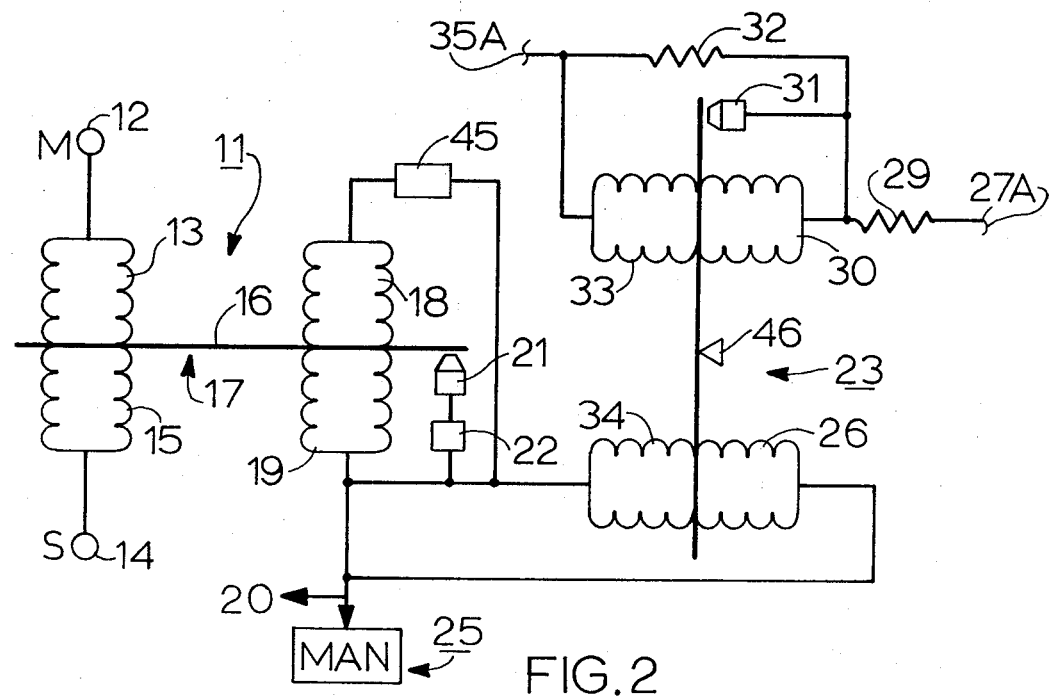
FIG. 2 is an abbreviated representation of the relationship between the primary process controller and the secondary process controller in the automatic mode of operation.

FIG. 2 represents the relationship between primary controller 11 and secondary controller 23 in the automatic mode of operation. Very simply, primary controller 11, on the basis of set point 14 and process measurement 12 being supplied to bellows 15 and 13, supplies the process output 20 while bellows 18 provides for the integrating function; flapper nozzle 21 and relay 22 provide the rebalancing pressure to bellows 19 as well as the output pressure to output 20. Switching pressure from section 27A is atmospheric, so that bellows 30 and 33 of secondary controller 23 are de-activated, having atmospheric access. Bellows 26 and 34, the set point and measurement bellows respectively of secondary controller 23, are both connected to output 20 so that they have appropriate pressures therein should controller 23 be activated by transfer to manual mode. In addition, output 20 supplies a pressure to manual station 25, which is operated during automatic in a follower mode, in which a member is mechanically positioned according to the output pressure 20. This permits the manual station 25 to be switched to manual operation with the manual knob connected through a gear to a bellows which already has the output pressure last remembered from automatic operation therein which output may thereupon be changed manually.

Figure 3:
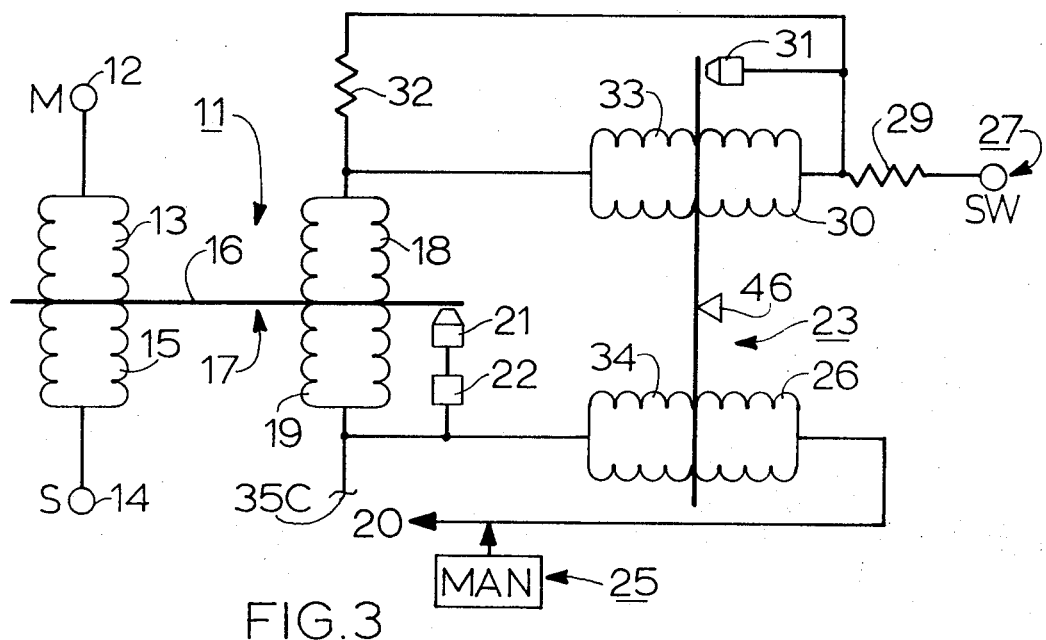
FIG. 3 is an abbreviated representation of the relationship between the primary process controller and the secondary process controller during manual operation.

FIG. 3 shows the relationship between primary controller 11 and secondary controller 23 in the manual mode, in which the output of manual station 25 is supplied both to process output 20 and to set point bellows 26 of secondary controller 23. Secondary controller 23 has its measurement bellows 34 connected to output bellows 19 of controller 11, and has reset bellows 33 connected to bellows 18 of primary controller 11. Controller 11 has its reset tank 45 disconnected in the manual mode so that the output from bellows 30 of secondary controller 23 via restrictor 32 produces an appropriate pressure in bellows 18 of primary controller 11 such that the output from bellows 19 of primary controller 11 is maintained at the pressure provided to output 20.

Desireable features of this system inhere in the arrangement whereby the manual group 25, 40 and 27 may be removed without interrupting automatic control, and whereby the automatic group 11, 23 may be removed without interrupting manual control.

It is obvious that controller 23 may conveniently be of any conventional type, such as reset, derivative, proportional, or combinations thereof. Similarly, this system can be employed with electronic controllers by adaptation obvious to those skilled in the art.

While there has been shown what is considered to be a preferred embodiment of the invention, it will be manifest that many changes and modifications may be made therein without departing from the essential spirit of the invention.

We claim:

1. In a known process control system of the type having a controller including:
   input means for a measurement signal;
   input means for a set point signal;
   comparison means coupled to said input means to produce a force responsive to the difference between the measurement and set point signals;
   a balanceable element to which said difference force is applied;
   means to detect any imbalance of forces applied to said balanceable element;
   negative feedback means responsive to said detection means for producing a rebalancing force applied to said balanceable element;
   output means for producing an automatic output signal corresponding to said rebalancing force;
   a manual signal device for producing an adjustable manual output signal;
   a final control element cooperating with the process to be controlled; and
   transfer switch means operable into automatic or manual state, said switch means serving in automatic state to direct said automatic output signal to said final control element and serving in manual state to direct said manual signal to said final control element;
   that improvement in such apparatus comprising:
   second detection means operable when said switch means is in manual state to detect any difference between said automatic output signal and said manual output signal;
   controller conditioning means responsive to said second detection means when said switch means is in manual state and operable to produce a conditioning force applied to said balanceable element corresponding to any difference between said automatic and manual signals;
   said first comparison means serving in manual state to continue to apply to said balanceable element said force corresponding to the difference between said measurement and set point signals, just as in automatic state;
   said negative feedback means functioning in manual state to maintain said balanceable element in balance with said automatic output signal equal to said manual signal, whereby upon switchback from manual to automatic state the signal directed to said final control element remains constant so as to prevent disturbing the process.

2. Apparatus as claimed in claim 1, wherein the controller is of the type including reset means to apply a time-variant force to said movable element to provide reset action in said automatic output signal;
   said conditioning means including means operable in manual condition to activate said reset means to apply said conditioning force to said movable element, whereby said reset means is maintained energized at a level commensurate with the development of an automatic output signal equal to the manual output signal then being applied to the control element.

3. Apparatus as claimed in claim 2, wherein said conditioning force is applied by said reset means to said first movable element in opposition to said rebalancing force.

4. In a known process control system of the type having a controller which includes:
   input means for a measurement signal;
   input means for a set point signal;
   comparison means coupled to said input means to produce a force responsive to the difference between the measurement and set point signals;
   a balanceable element to which said difference force is applied;
   means to detect any imbalance of forces applied to said balanceable element;

negative feedback means responsive to said detection means for producing a rebalancing force applied to said balanceable element;

output means for producing an automatic output signal corresponding to said rebalancing force;

a manual signal device for producing an adjustable manual output signal;

a final control element cooperating with the process to be controlled; and transfer switch means operable into automatic or manual state, said switch means serving in automatic state to direct said automatic output signal to said final control element and serving in manual state to direct said manual signal to said final control element;

that improvement in such apparatus comprising:

second comparison means to produce a second force responsive to the difference between said automatic output signal and said manual output signal;

a second balanceable element to which said second difference force is applied;

second means to detect any imbalance of forces applied to said second balanceable element;

second negative feedback means responsive to said second detection means for producing a rebalancing force applied to said second balanceable element; and second output means operative when said transfer switch means is in manual state for producing a conditioning force applied to said first balanceable element corresponding to said second negative feedback force, whereby when the system is in manual state the automatic output signal is maintained equal to the manual output signal so that switchback from manual to automatic state does not affect the signal supplied to the final control element.

5. In a known pneumatic process control system of the type having a controller which includes:

first pressure-responsive means for producing a first force corresponding to a pneumatic measurement signal;

second pressure-responsive means for producing a second force corresponding to a pneumatic set point signal;

a balanceable element adapted to receive said first and second forces in opposition;

negative feedback means for producing a rebalancing force applied to said first balanceable element responsive to said movement of said element;

output means for producing a pneumatic automatic output signal corresponding to said first rebalancing force;

manually-adjustable means for producing a pneumatic manual output signal;

a final control element adapted to receive a pneumatic signal and to cooperate with the process to be controlled in order to vary the magnitude of a desired condition;

transfer switch means operable into manual or automatic state adapted to direct said automatic output signal to said final control element during said automatic state and to direct said manual output signal to said final control element during said manual state;

that improvement in such a known process control system which additionally comprises a transfer conditioning unit including:

means operable when said transfer switch means is in manual state to produce a pneumatic conditioning signal corresponding to the difference between said automatic output signal and said manual output signal; and third pressure-responsive means responsive to said conditioning signal for applying a third force to said balanceable element related to said difference signal and in a direction such that during manual operation said balanceable element is continuously rebalanced to maintain said automatic output signal equal to said manual output signal.

6. Apparatus as claimed in claim 5, wherein said third pressure-responsive means comprises pneumatically operable reset means.

7. Apparatus as claimed in claim 5, wherein said transfer unit includes:

fourth pressure-responsive means operable to produce a fourth force related to said automatic output signal;

fifth pressure-responsive means operable to produce a fifth force related to said manual output signal;

a second movable element adapted to receive said fourth and fifth forces in opposition; and means to detect movement of said second element and to produce said difference signal in correspondence therewith.

8. Apparatus as claimed in claim 7, wherein said known controller includes pneumatically operated reset means arranged to apply a force to said first balanceable element to develop reset action in said automatic output signal;

said transfer switch means serving in manual state to direct said pneumatic difference signal to said reset means to cause said reset means to apply a force to said first movable element corresponding to said difference signal.

9. In a controller of the type having a balanceable control element movable in response to a deviation between measurement and set point values, said movable element being co-operatively associated with sensing means responsive to the position of said element for producing an automatic output signal corresponding to the relative positioning thereof; there being adjustable means for producing a manual output signal and transfer switch means operable into automatic or manual state for selectively directing either said automatic signal or said manual output signal to a regulating element such as a process valve;

that improvement in such a controller for permitting simplified operation in transferring between automatic and manual state, comprising the combination of:

first conditioning means under the control of said transfer switch means; said first conditioning means including means operable, when said transfer switch means is in manual state, to apply to said balanceable element a conditioning force responsive to any difference between said automatic and manual signals and serving to reposition said movable element with respect to said sensing means so as to maintain said automatic and manual signals equal, in preparation for smooth switchback to automatic state; and second conditioning means operable when said transfer switch means is in automatic state; said second conditioning means including tracking means responsive to said automatic output signal and operable to continuously control the position of a signal-adjusting device in correspondence with the magnitude of said automatic output signal, said second conditioning means further including means operable by said signal adjusting device for setting the value of said manual output signal equal to said automatic output signal at the time of switchover from automatic to manual state, thereby to provide a smooth transfer to manual state.

10. A pneumatic controller comprising the combination of:

a balanceable control element movable in response to a deviation between measurement and set point signals, said movable element being cooperatively associated with sensing means responsive to the position of said element producing an automatic output signal corresponding to the positioning thereof;

reset means coupled to said automatic output signal and arranged to apply to said movable element a time-variant force to adjust the positioning thereof to develop reset action in said automatic output signal;

the controller further including adjustable means for producing a manual output signal and transfer switch means operable into automatic or manual state for selectively directing either said automatic output signal or said manual output signal to a regulating element such as a process valve;

comparison means under the control of said transfer switch means and operable, when said transfer switch means is in manual state, to direct to said reset means a continuous conditioning signal responsive to any difference between said automatic and manual signals, said reset means serving to reposition said movable element with respect to said sensing means as required to maintain said automatic and manual signals equal, in preparation for smooth switchback to automatic state;

said comparison means including a signal-producing device having means operable throughout the range of signal comparisons, including the cross-over sign-change point, to produce a continuously-variable conditioning signal free of dead-space effects and corresponding at all values within said range to the difference between said automatic and manual signals, whereby to assure that the reset means receives at all times a conditioning signal of proper value to maintain equality between said automatic and manual signals.

11. Apparatus as claimed in claim 10, wherein said transfer switch means includes means operable in manual state to interrupt the connection between said reset means and said automatic output signal.

12. Apparatus as claimed in claim 10, including pneumatic restrictor and capacity-tank means in the coupling between said comparison means and said reset means.

13. Apparatus as claimed in claim 10, wherein said comparison means comprises a force-balance member having differencing means for applying thereto a force corresponding to the difference between said automatic and manual signals;

a pneumatic nozzle adjacent said force-balance member;

feedback means responsive to the output of said nozzle to apply a rebalance force to said member to maintain the forces thereon in balance; and means coupled to said feedback means for producing said conditioning signal.

14. Apparatus as claimed in claim 15, wherein said differencing means comprises first and second pneumatic devices for applying oppositely-directed forces to said member corresponding to said automatic and output signals respectively;

said feedback means comprising third and fourth pneumatic devices for applying oppositely-directed forces to said member;

means coupling a signal from said nozzle to both said third and fourth devices; and restrictor means in the connection between said nozzle and said fourth device.

15. A pneumatic controller comprising the combination of:

a first force-balance member;

a first set of pneumatic pressure-responsive devices arranged to apply oppositely-directed forces to said first member corresponding respectively to measurement and set point values;

a first pneumatic nozzle mounted adjacent said first member to produce an output signal responsive to the positioning thereof;

negative feedback means connected to the signal produced by said nozzle comprising a second set of pneumatic pressure-responsive devices developing oppositely-directed forces on said force-balance member, and reset means coupled to said second set of devices to develop reset action in the output signal from said nozzle;

adjustable means for producing a manual output signal and transfer switch means operable into automatic or manual state for selectively directing either said automatic output signal or said manual output signal to a process regulating device;

a second force-balance member;

a third set of pressure-responsive devices arranged to apply oppositely-directed forces to said second member;

means operable with said transfer switch means in manual state for directing said automatic and manual output signals to said third set of pressure-responsive devices to apply to said second member a net force corresponding to the difference between said automatic and manual output signals;

a second pneumatic nozzle adjacent said second member to produce a comparison signal responsive to any unbalance of said second member;

a fourth set of pressure-responsive devices coupled to the signal of said second nozzle for applying oppositely directed forces to said second member to maintain said second nozzle in balance; and means operable when in manual state for coupling the output signal of said second nozzle to said second set of pressure-responsive devices, to adjust said automatic output signal to keep it equal to said manual signal.

* * * * *

UNITED STATES PATENT OFFICE
CERTIFICATE OF CORRECTION

Patent No. 3,680,580    Dated August 1, 1972

Inventor(s) Earl A. Beardsley et al.

It is certified that error appears in the above-identified patent and that said Letters Patent are hereby corrected as shown below:

Col. 8, line 13, "15" should read -- 13 --.

Signed and sealed this 15th day of May 1973.

(SEAL)
Attest:

EDWARD M. FLETCHER, JR.          ROBERT GOTTSCHALK
Attesting Officer                Commissioner of Patents